United States Patent
Söderberg

[11] 4,035,698
[45] July 12, 1977

[54] MEANS FOR COUNTERACTING SLIPPING AND SKIDDING IN A MOTOR-DRIVEN RAIL-VEHICLE

[75] Inventor: Bo Söderberg, Vasteras, Sweden

[73] Assignee: ASEA Aktiebolog, Sweden

[21] Appl. No.: 407,505

[22] Filed: Oct. 18, 1973

[30] Foreign Application Priority Data

Apr. 6, 1973 Sweden .............................. 7304860

[51] Int. Cl.² .................................................. B61C 15/12
[52] U.S. Cl. .................................. 318/52; 318/434; 105/61
[58] Field of Search .................... 318/52, 344, 434; 105/61; 291/2; 303/21 BE; 180/82

[56] References Cited

U.S. PATENT DOCUMENTS

| | | | |
|---|---|---|---|
| 3,257,597 | 6/1966 | Weiser | 318/344 |
| 3,378,743 | 4/1968 | Weiser | 318/52 |
| 3,482,887 | 12/1969 | Sheppard | 303/106 |
| 3,541,406 | 11/1970 | Etienne | 318/52 |
| 3,560,759 | 2/1971 | Buehler et al. | 318/52 |
| 3,657,601 | 4/1972 | Darrow | 318/52 |

FOREIGN PATENT DOCUMENTS

1,182,855 3/1970 United Kingdom .................. 318/52

*Primary Examiner*—Robert K. Schaefer
*Assistant Examiner*—John J. Feldhaus
*Attorney, Agent, or Firm*—James H. Marsh, Jr.

[57] ABSTRACT

For counteracting slipping and skidding in a motor-driven rail vehicle, the acceleration of the driving wheel is sensed and is used to control the torque of the driving motor. The arrangement includes a device which is responsive to an absolute value of the acceleration which exceeds a predetermined first value to reduce the torque, and to a decrease in the absolute value of the acceleration to a second value to increase the torque. The torque reducing arrangement reduces the torque at a predetermined rate until a low first torque value has been reached, then reduces the torque at a lower rate until the predetermined second low acceleration value is reached, and thereafter increases the torque, the reverse of this procedure is followed when increasing the torque.

4 Claims, 2 Drawing Figures

MEANS FOR COUNTERACTING SLIPPING AND SKIDDING IN A MOTOR-DRIVEN RAIL-VEHICLE

BACKGROUND OF THE INVENTION

1. Field of the Invention

The present invention relates to a means for counteracting slipping and skidding in a motor-driven rail-vehicle.

2. The Prior Art

A great problem in connection with operation by railway engines with a very high utilization of the available adhesion is that one or more drive shafts is/are subjected to slipping during acceleration or skidding during motor braking. As long as not all the shafts slip the slipping can be detected in a known manner, for example by comparing the speeds of the shafts with each other, and counteracted. However, if all the shafts slip simultaneously this simple detecting method cannot be used. The driver will certainly notice the slipping, for example with the help of the speedometer, and the torque, i.e. the tractive force or the braking force, can be reduced manually. However, before the driver is able to do this, the drive wheels may have accelerated to a very great speed or been locked when braking. It has been found that, when cournteracting such slipping (locking of the wheels) very considerable variations in the tractive force may arise, which, for one thing, cause high mechanical stresses in the motor-drive vehicle itself and, for another, involve a serious risk of an engine-driven train being pulled apart because of the coupling devices giving way.

SUMMARY OF THE INVENTION

According to the invention, an acceleration-sensing member senses the angular acceleration of the driving wheel and controls the torque of the motor. The acceleration-sensing member, when an acceleration occurs whose absolute value exceeds a predetermined first value, acts to reduce the torque. When the absolute value of the acceleration decreases to a predetermined second value, the torque is increased.

During the reduction, the torque is reduced at a predetermined rate to start with, is continued at a lower rate when a predetermined low first torque value has been reached, until the absolute value of the acceleration has decreased to a second value and thereafter increases the torque. When the torque is being increased, it is increased at a predetermined rate until a predetermined second torque value lower than the maximum torque has been reached, and thereafter increases, the torque at a lower rate.

BRIEF DESCRIPTION OF THE DRAWINGS

The invention aims at providing a means which eliminates these problems. The invention will be further described in connection with the accompanying drawing.

DESCRIPTION OF THE PREFERRED EMBODIMENTS

Figure 1:
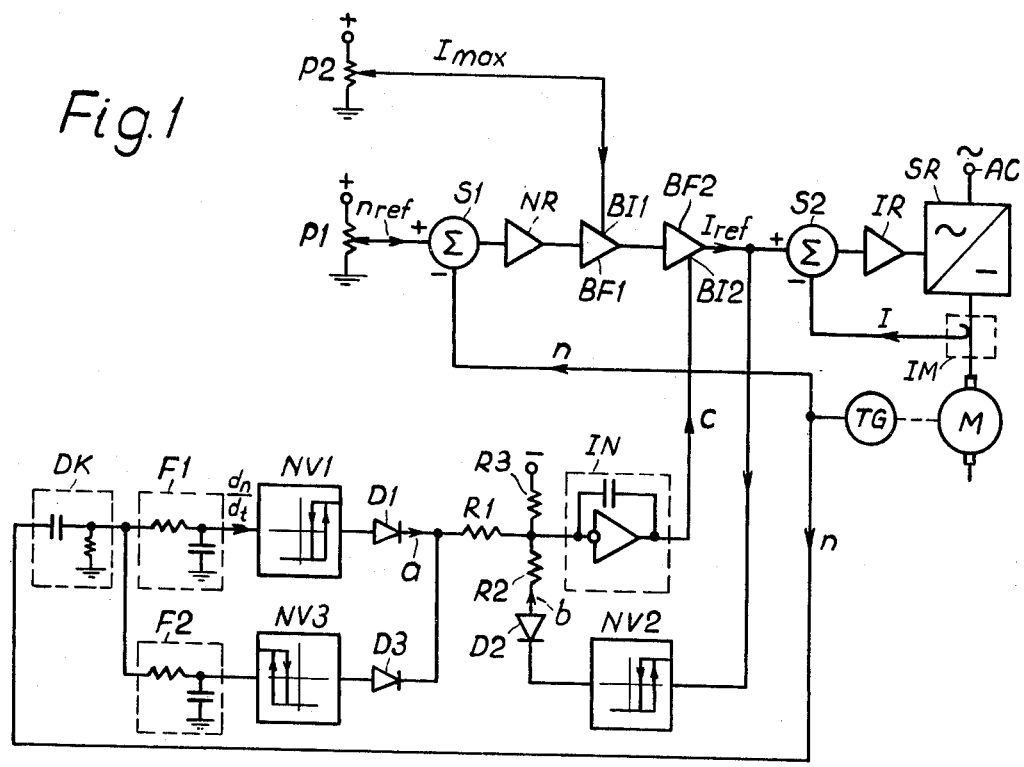
FIG. 1 shows a system according to the invention.

FIG. 1 shows a drive system for an electric locomotive. The directcurrent motor M, the armature of which is shown, drives one or more drive axles (not shown), for example by means of gear reduction sets. The armature is fed with direct current from a controllable electronic convertor SR, the alternating-current connection AC of which is connected to an alternating-current network. A desired value $I_{ref}$ for the motor current is compared in the comparison device S2 with the real value I of the motor current obtained from the current-measuring device IM. The difference is supplied to a current regulator IR, which controls the output voltage of the static converter so that I endeavours to coincide with $I_{ref}$. A tachometor generator TG is connected to the motor or the drive wheels and emits a signal corresponding to the speed of the wheels $n$. From the potentiometer P1 a desired value $n_{ref}$ for the speed is obtained. The difference between $n$ and $n_{ref}$ is obtained from the comparison device S1 and is supplied to the speed regulator NR. The output signal of this constitutes in principle the current reference. It is supplied to S2 by way of two limiting amplifiers BF1 and BF2. Each of these has one limiting input. BI1 and BI2, respectively. The output signal from a limiting amplifer corresponds essentially to the input signal but cannot exceed the value which is supplied to the limiting input. From the potentiometer P2 an adjustable value $I_{max}$ is obtained, which is supplied to the limiting input of the amplifier BF1. In this way $I_{ref}$ and thus the acceleration of the vehicle (the train) is limited upwards to a value corresponding to $I_{max}$. The part of the system described so far is already known.

According to the invention a diferentiating circuit DK has its input connected to the tachometer generator TG. The output signal of the diferentiating circuit is filtered in a low-pass filter F in order to reduce the effect of interference, noise etc., and is supplied to two flip-flops NV1 and NV3, i.e. bistable circuits having two stable values on the output signal, one positive and one negative. The flip-flop NV1 is arranged to switch from negative to positive output signal at a certain positive value on the input signal and, in the case of decreasing input signal, to switch from positive to negative output signal at a lower absolute level of the input signal than that at which the change to a positive output was made. The flip-flop NV1 is arranged to switch to a positive output at a level of $dn/dt$ which exceeds that which is obtained in a normal acceleration with no slipping, and similarly the flip-flop NV3 is arranged to switch to a positive output signal at a level of $dn/dt$, the abosolute value of which exceeds that which is obtained during normal braking. These levels of switching may be permanent, or they may be adjustable in dependence on the weight of the train and possibly also on the adjusted maximum tractive force (braking force), $I_{max}$. The flip-flops are arranged to switch to a negative output signal at a low absolute value of $dn/dt$, possibly at $dn/dt = 0$.

A positive output signal from NV1 or NV3 is supplied by way of the diode D1 or D3 and the resistor R1 to the input of a sign-reversing integrator IN, whereas a negative output signal from NV1 and NV3 is blocked by D1 and D3, respectively. The input of the integrator is supplied, by way of the diode D2 and the resistor R2, with the output signal from a flip-flopNV2. The input signal of this flip-flop consists o the current reference $I_{ref}$. The flip-flop NV2 operates in the same way as the flipflop NV1. It switches to a positive output signal at a value of $I_{ref}$ which may be, for example, about 75 % o the maximally obtainable motor current, and it switches to a negative output signal at a value of $I_{ref}$ which is so choesen, for example about 10 % of he maximally obtainable motor current that, as far as experience goes, slipping is normally eliminated. The resistance of the resistor R2 is greator than that of R1, so, when a positive output signal is emitted from NV1 or NV3 and a negative output signal from NV2, the output signal from NV1 and NV3, respectively, will dominate.

Further, a negative direct voltage is connected to the input of the integrator by way of a resistor R3. This voltage (and the resistance of R3) is so chosen that the integrator is relatively slowly driven towards its end position when no other input signals are present. Said end position is suitably chosen so that it corresponds to the maximally obtainable motor current. The output signal from the integrator is supplied to th limiting input BI2 of the limiting amplifier BF2, the function of which has been described above.

Figure 2:
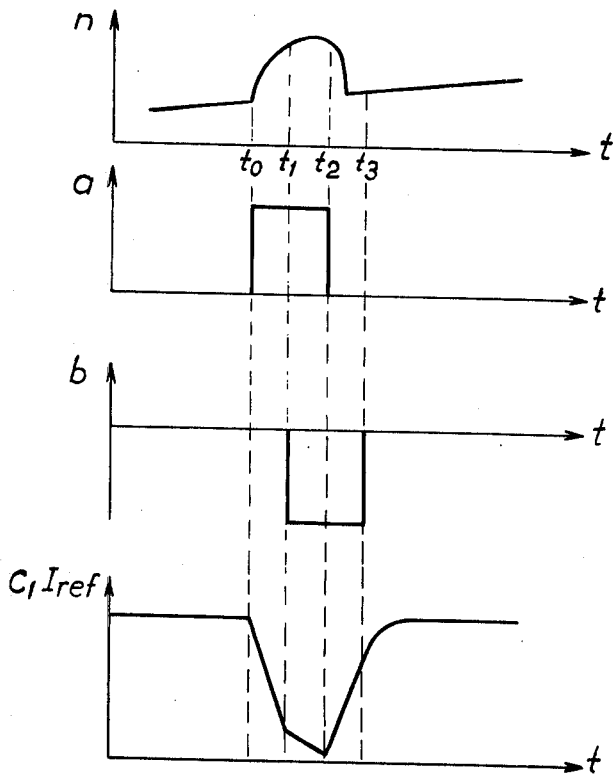
FIG. 2 some of the system variables as functions of the time.

During normal operation with no slipping, NV1 and NV3 emit negative output signals. The input signal to the integrator by way of R3 keeps the output signal of the integrator in its positive end position, and BF2 has therefore no effect on the motor current. Depending on the motor current, NV2 can emit either a positive output signal, which is blocked by D2, or a negative output signal, which has no effect on the integrator, which is already in its positive and position. FIG. 2 shows the function of the device when the drive wheels are slipping during acceleration. Before the time $t_0$, $I_{ref}$ and also the motor current have their maximum values. The train accelerates with a constant acceleration $dn/dt$ and the speed n increases slowly. NV1 has a negative output and the input signal $a$ to the integrator is zero. NV2 has a positive output signal and the input signal $b$ to the integrator is also zero. The output signal $c$ of the integrator has its positive limit value, corresponding to the maximum motor current.

At $t_0$ the wheels by the motor start slipping. $dn/dt$ increases instantaneously to a high value. NV1 switches to a positive output signal. The output signal $c$ of the integrator starts to fall relatively rapidly at a rate determined, among other things by said output signal and by R1. $I_{ref}$ will be limited by BF2 and decrease at the same rate as the signal $c$. When, at $t_1$, $I_{ref}$ has decreased to about 10 % of the maximum motor current NV2 switches to negative output signal. This counteracts the positive signal from NV1, and c and $I_{ref}$ therefore decrease more slowly. At $t_2$ the acceleration of the drive wheels has decreased to the level of switching (zero in the figure) of the flip-flop NV1. The signal a becomes zero and the negative signal $b$ increases the output signal of the integrator at a certain rate determined, among other things by R2, and thereby also $I_{ref}$ and the motor current. At $t_3$, $I_{ref}$ has been become so high that NV2 switches over, and the signal $b$ becomes zero. The negative signal obtained by way of R3 is now the only input signal to the integrator, and the output signal of this will therefore, like $I_{ref}$, rise towards a value which corresponds to the maximum current, according to an exponential function with a relatively great time constant. Because of this smooth change to maximum aceleration, slipping is prevented as far as possible from arising again. In a corresponding way NV3 acts when the wheels start locking when braking.

The time constants of the system are in a typical case chosen so that the whole procedure described so far requires a time of the order of one second. The maximum overspeed to which the drive wheels are able to accelerate is in a typical case limited to some 10 km/h. In this way the loss of traction (due to the rapid counteraction of the slipping) becomes very small, and the violent variations of the tractive force as well as the jerks in the train are practically eliminated.

In those cases in which two or more motors are driving one drive axle each and fed from a common electronic convertor, the axle pressures are generally unevenly distributed between the axles during acceleration. Experience the shows which axle normally slips first, and the speed signal from this axle can then be employed for controlling a system for counteracting the slipping according to the invention which is connected to the convertor. On the other hand, if it is desirable that the system shall only react if all the axles slip, the speed signal from the axle which normally slips last of all is employed. Alternatively, a selector circuit can be arranged to select the greatest of the speed signals from the various axles, which is then supplied to the system according to the invention. The system will then start acting as soon as an axle starts slipping. However, a disadvantage of this is that a reduction of the tractive force is obtained which is unnecessary in some cases.

According to another alternative, the selector circuit can therefore be arranged to select the smallest of the speed signals. The system will then only become active if all the axles connected to the same convertor slip, and according to this alternative a greater tractive force and therefore a more rapid acceleration is normally obtained. Instead of the speed signal being connected to the input of the selector circuit, the time derivatives of the various speed responses may of course be supplied to said input.

A vehicle may of course be provided with several electronic convertors, each one feeding one or more motors. Each convertor is then suitably provided with a system for counteracting slipping of the kind described above. As an alternative, the speed signals from all the motors or axles may be supplied to one single slipping-counteracting system by way of a selector circuit, the output signal of said system then being supplied to all the convertors for limiting their current.

The variants of the invention described in connection with acceleration may be applied also during retardation.

The system has been described above in connection with electrical direct-current motors fed from controllable electronic convertors. It may of course be used also with other types of electric motors and with other systems for measuring and regulation of the tractive force, as well as with other types of drive motors.

The concrete embodiment of the system according to the invention shown in FIG. 1 is only one example, and the system may be designed in a good many ways so that essentially in the same function is obtained.

Thus, for example, the output signal c from the integrator IN may be supplied to the comparison circuit S2 and there be substracted from $I_{ref}$ instead of being supplied to a limiting amplifier.

I claim:
1. In a motor-driven rail vehicle having a driving wheel driven by a driving motor, an acceleration-sensing member for sensing the angular acceleration of the driving wheel and a torque-controlling member for controlling the torque of the motor, means connecting the acceleration-sensing member to the torque-controlling member including means responsive to an acceleration, the absolute value of which exceeds a pre- determined first value, to reduce the torque rapidly and, to the decrease of the absolute value of the acceleration to a predetermined second value, to increase the torque, the torque-controlling member including means to carry out said reduction of the torque at a predetermined rate, to continue to reduce the torque at a lower rate, when a predetermined low, first torque value has been reached, until the absolute value of the acceleration has decreased to said second value, and thereafter to increase the torque.

2. In a device according to claim 1, the torque-controlling member including means to carry out the increase of the torque at a predetermined rate until a predetermined, second torque value, lower than the maximum torque, has been reached, and thereafter to increase the torque at a lower rate.

3. In a device according to claim 1 in a railway engine, said first, predetermined value of the angular acceleration being adjustable in dependence on the weight of the train.

4. In a device according to claim 1 in a rail vehicle driven by a direct current motor, the torque-controlling member including means to influence the armature current of the driving motor.

* * * * *